United States Patent
Moon et al.

(10) Patent No.: US 8,894,733 B2
(45) Date of Patent: Nov. 25, 2014

(54) METHOD FOR RECYCLING CERIUM OXIDE ABRASIVE

(75) Inventors: Won-Jae Moon, Seoul (KR); Sang-Oeb Na, Seoul (KR); Hyung-Young Oh, Goyang-si (KR)

(73) Assignee: LG Chem, Ltd., Seoul (KR)

( * ) Notice: Subject to any disclaimer, the term of this patent is extended or adjusted under 35 U.S.C. 154(b) by 321 days.

(21) Appl. No.: 13/046,306

(22) Filed: Mar. 11, 2011

(65) Prior Publication Data

US 2011/0219704 A1    Sep. 15, 2011

(30) Foreign Application Priority Data

Mar. 12, 2010  (KR) .................. 10-2010-0022391

(51) Int. Cl.
| | | |
|---|---|---|
| *B24D 3/02* | (2006.01) | |
| *C09C 1/68* | (2006.01) | |
| *C09K 3/14* | (2006.01) | |
| *C01F 17/00* | (2006.01) | |
| *B01D 21/01* | (2006.01) | |
| *B03D 3/00* | (2006.01) | |
| *C02F 1/52* | (2006.01) | |
| *B24B 55/12* | (2006.01) | |
| *C09G 1/02* | (2006.01) | |
| *B24B 1/00* | (2006.01) | |
| *B24B 7/19* | (2006.01) | |
| *B24B 7/30* | (2006.01) | |
| *C02F 1/68* | (2006.01) | |
| *B01D 37/00* | (2006.01) | |
| *B01D 61/00* | (2006.01) | |
| *C02F 1/00* | (2006.01) | |

(52) U.S. Cl.
CPC . *B24B 55/12* (2013.01); *C09K 3/14* (2013.01); *C09G 1/02* (2013.01)
USPC .............. 51/309; 423/21.1; 423/263; 451/41; 210/723; 210/724; 210/726; 210/749; 210/767

(58) Field of Classification Search
None
See application file for complete search history.

(56) References Cited

U.S. PATENT DOCUMENTS

2007/0144075 A1 *  6/2007  Kin et al. .................. 51/298
2007/0258875 A1    11/2007  Hiraiwa et al.

FOREIGN PATENT DOCUMENTS

| JP | 11-90825 | 4/1999 | |
|---|---|---|---|
| JP | 11-319755 | 11/1999 | |
| JP | 11-319755 A | 11/1999 | |
| JP | 11319755 A * | 11/1999 | ............... B09B 3/00 |
| JP | 2003-205460 | 7/2003 | |
| JP | 2003-205460 A | 7/2003 | |
| JP | 2004-306210 | 11/2004 | |
| JP | 2004-306210 A | 11/2004 | |
| JP | 2004306210 A * | 11/2004 | ............. B24B 57/02 |
| JP | 200697014 A | 4/2006 | |

* cited by examiner

*Primary Examiner* — Nam Nguyen
*Assistant Examiner* — Clare Perrin
(74) *Attorney, Agent, or Firm* — McKenna Long & Aldridge LLP

(57) ABSTRACT

Disclosed is a method for recycling a cerium oxide abrasive. The method may include adding a strong alkali solution to a slurry waste of the cerium oxide abrasive, adding sodium fluoride to the slurry waste, and separating a cerium oxide particle included in the slurry waste from other kinds of particles.

5 Claims, 2 Drawing Sheets

METHOD FOR RECYCLING CERIUM OXIDE ABRASIVE

CROSS-REFERENCE TO RELATED APPLICATION

This application claims priority to Korean Patent Application No. 10-2010-0022391 filed in Republic of Korea on Mar. 12, 2010, the entire contents of which are incorporated herein by reference.

BACKGROUND OF THE INVENTION

1. Field of the Invention

The present invention relates to a method for recycling a cerium oxide abrasive, and more particularly, to a method for effectively recycling a cerium oxide abrasive used to polish a glass material, such as a glass substrate or a photomask, for reuse of the abrasive.

2. Description of the Related Art

A polishing process is performed to planarize various semiconductor substrates including a glass substrates or a photomask, or the surface of a thin film formed on the semiconductor substrates. Generally, an abrasive is used in the polishing process to improve the polishing efficiency. A variety kinds of abrasives are available, and among them, a cerium oxide abrasive is widely used.

Cerium oxide ($CeO_2$) is a high-function ceramic material used in various applications such as catalysts, fluorescent materials, cosmetics, and the like. A cerium oxide abrasive containing cerium oxide as a main component is used to polish many kinds of glass materials. In particular, recently the cerium oxide abrasive is widely used in electric and electronic appliances such as a glass substrate for an LCD (Liquid Crystal Display), a glass for a recording medium including a hard disc, and the like, and an application range of the cerium oxide abrasive is increasingly expanding.

The cerium oxide abrasive improves the polishing efficiency through a mechanical reaction in a polishing process of a glass material. That is, the polishing efficiency in the polishing process is improved using friction between the cerium oxide abrasive and a polishing pad, and the glass material. Also, the polishing efficiency may be improved through a chemical reaction. That is, a glass or a photomask contains silicon oxide ($SiO_2$) as a main raw material, and silicon oxide exists in the form of Si—OH on the surface of particles in an aqueous solution by a reaction of silicon atoms with OH groups. In this instance, the cerium oxide abrasive chemically reacts with, in particular, bonds with the OH groups in the Si—OH, and then the silicon atoms are detached from the glass or the photomask.

Generally, the cerium oxide abrasive is placed in a slurry tank as a slurry containing cerium oxide, water, and a dispersant, and when a polishing process is performed, the cerium oxide abrasive is fed to a polishing machine. However, the cerium oxide abrasive is high-priced, and is used with a considerable amount in one polishing process. This is the reason why the cerium oxide abrasive is reused throughout several polishing processes. In other words, the cerium oxide abrasive in the type of a slurry is provided from the slurry tank to the polishing machine for use in a polishing process, and then is re-provided to the slurry tank for reuse.

However, the repetitive use of the cerium oxide abrasive in the polishing process results in reduced polishing efficiency of the cerium oxide abrasive. FIGS. 1 and 2 illustrate, respectively, an Si—OH layer 200 formed on and fine powder 300 attached to the surface of a cerium oxide particle 100 after a repetitive use of a cerium oxide abrasive in a polishing process according to a conventional art.

That is, as described above, the cerium oxide abrasive acts to detach the Si—OH structure from silicon oxide, and accordingly, when the cerium oxide abrasive is repeatedly used, the Si—OH layer 200 may be formed on the surface of the cerium oxide particle 100, as shown in FIG. 1. Moreover, the fine powder 300 occurring during a polishing process may be attached to the surface of the cerium oxide particle 100, as shown in FIG. 2. Here, the fine powder 300 may be fine powder of a glass material ($SiO_2$) or cerium oxide ($CeO_2$).

When the Si—OH layer 200 is formed on or the fine powder 300 is attached to the cerium oxide particle 100 as descried above, the cerium oxide abrasive does not have polishing effects any longer. This is because the Si—OH layer 200 or the fine powder 300 reduces the exposed area of the cerium oxide particle 100, thereby hindering mechanical and chemical reactions of the cerium oxide particle 100 during a polishing process. In order to solve the problem, the used cerium oxide abrasive should be replaced. However, as described above, a cerium oxide abrasive is high-priced, and consequently, it causes an increase in a manufacturing cost of a product using a glass material.

SUMMARY OF THE INVENTION

The present invention is designed to solve the above-described problems, and therefore, it is an object of the present invention to provide a method for recycling a cerium oxide abrasive for an effective reuse of the cerium oxide abrasive in a polishing process of a glass material.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In order to achieve the object, the present invention provides a method for recycling a cerium oxide abrasive used in a polishing process of a glass material, including adding a strong alkali solution to a slurry waste of the cerium oxide abrasive, adding sodium fluoride to the slurry waste, and separating cerium oxide particles included in the slurry waste from other kinds of particles.

According to the present invention, the cerium oxide abrasive used in a polishing process of a glass material may be effectively recycled by effectively removing an Si—OH layer and fine powder formed on the surface of the cerium oxide particles in the slurry waste, and by enabling a clean layer separation between the cerium oxide particles and other kinds of particles.

Accordingly, the cerium oxide abrasive may be repeatedly reused in a polishing process to substantially extend a replacement cycle of the abrasive, thereby effectively reducing the polishing process cost, and consequently a manufacturing cost of a product using a glass material.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Hereinafter, the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the description proposed herein is just a preferable example for the purpose of illustrations only, not intended to limit the scope of the invention, so it should be understood that other equivalents and modifications could be made thereto without departing from the spirit and scope of the invention.

Figure 3:
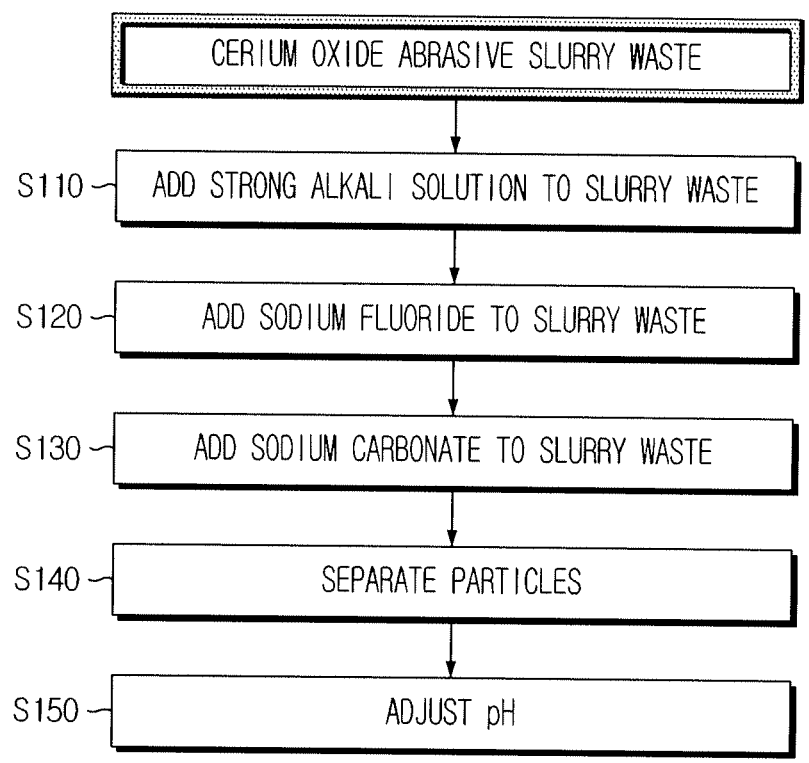
FIG. 3 is a schematic flowchart illustrating a method for recycling a cerium oxide abrasive according to an embodiment of the present invention.

FIG. 3 is a schematic flowchart illustrating a method for recycling a cerium oxide abrasive according to an embodiment of the present invention.

Referring to FIG. 3, the method for recycling a cerium oxide abrasive may include a step (S110) of adding a strong alkali solution, a step (S120) of adding sodium fluoride, and a step (S140) of separating particles.

The step (S110) of adding a strong alkali solution comprises adding a strong alkali solution to a slurry waste of the cerium oxide abrasive. In this instance, the strong alkali solution may be a chemical species containing an OH component. Preferably, the strong alkali solution may be at least one selected from the group consisting of an NaOH solution and a KOH solution.

Figure 1:
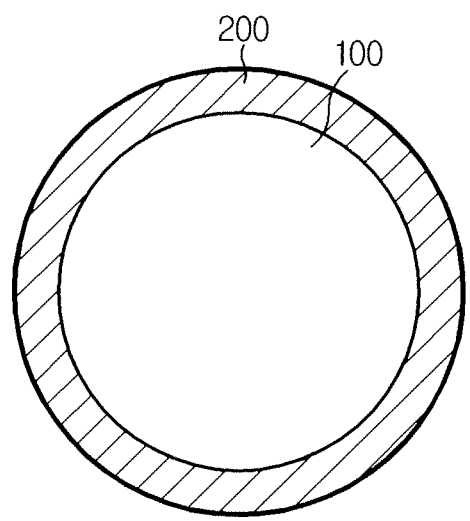
FIGS. 1 and 2 illustrate an Si—OH layer and fine powder attached on the surface of a cerium oxide particle after a repetitive use of a cerium oxide abrasive in a polishing process according to a conventional art.
Figure 2:
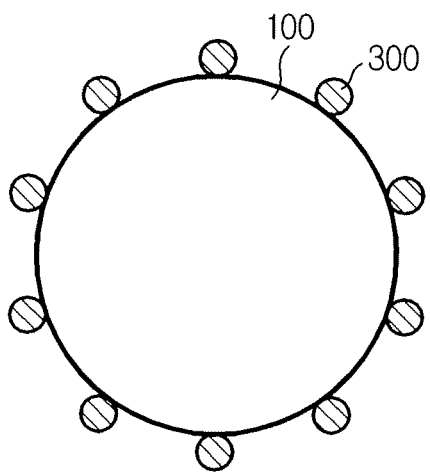

The strong alkali solution may remove an Si—OH layer and fine powder of a glass material ($SiO_2$) from cerium oxide particles included in the slurry waste of the cerium oxide abrasive. That is, an Si—OH layer may be formed on or $SiO_2$ fine powder may be attached to the surface of cerium oxide particles in the slurry waste of the cerium oxide abrasive repeatedly used during a polishing process, as shown in FIGS. 1 and 2. The strong alkali solution may detach the Si—OH layer and the $SiO_2$ fine powder from the surface of the cerium oxide particles.

According to an embodiment, when an NaOH solution is added to the cerium oxide abrasive slurry waste as the strong alkali solution in the step (S110), a sodium (Na) atom in NaOH bonds with the Si—OH layer or a silicon (Si) atom in the $SiO_2$ fine powder to form an Na—Si—O structure. Accordingly, the Si—OH layer and the $SiO_2$ fine powder may be easily detached from the surface of the cerium oxide particles.

When an NaOH solution is used in the step (S110) as described above, the concentration of the NaOH solution may be 6 g/L. Also, the step (S110) may be performed at temperature between 85° C. and 95° C. However, the present invention is not limited in this regard.

Although this embodiment shows an NaOH solution as a strong alkali solution, other strong alkali solutions such as a KOH solution may be used.

The step (S120) of adding sodium fluoride (NaF) comprises adding sodium fluoride to the cerium oxide abrasive slurry waste. The addition of sodium fluoride to the slurry waste contributes to better layer separation of the component treated and removed by the strong alkali solution in the step (S110) from the cerium oxide particles.

For example, when an NaOH solution is used as the strong alkali solution in the step (S110) as described above, the addition of sodium fluoride results in an Na—F—Si—O structure by bonds between sodium, silicon, and fluorine (F) atoms. Particles of the Na—F—Si—O structure are easy to separate from the cerium oxide ($CeO_2$) particle, thereby improving the separation efficiency in the step (S140).

In this instance, the concentration of sodium fluoride may be 1 g/L, however the present invention is not limited in this regard.

Although FIG. 3 shows the step (S120) is performed after the step (S110), the step (S110) and the step (S120) may be simultaneously performed, or the step (S120) may be performed before the step (S110).

The step (S140) of separating particles comprises separating the cerium oxide particle from other kinds of particles in the slurry waste. For example, when an NaOH solution is used as the strong alkali solution in the step (S110) and sodium fluoride is added in the step (S120), a water glass of the Na—F—Si—O structure and the cerium oxide particles exist in the cerium oxide abrasive slurry waste. The step (S140) of separating particles comprises separating the cerium oxide particles from other kinds of particles, for example, particles having the Na—F—Si—O structure.

In the step (S140), the cerium oxide particles may be separated using a variety of methods. Preferably, the method may be at least one selected from the group consisting of sedimentation, centrifugal separation, specific gravity separation, floatation, and filtration.

The cerium oxide particles may be separated through a sedimentation method for removing a supernatant after a predetermined time passes subsequent to agitation and setting, a centrifugal separation method for separating particles from a solution by solid-phase extracting large particles using the action of the centrifugal force with fine particles existing in the solution, and a specific gravity separation method using a difference in specific gravity between particles. Also, the cerium oxide particles may be separated through floatation and filtration using a filter.

Preferably, the method for recycling a cerium oxide abrasive according to the present invention may further include a step (S130) of adding sodium carbonate ($Na_2CO_3$) after the step (S120) of adding sodium fluoride.

When sodium carbonate is added to the cerium oxide abrasive slurry waste provided with the strong alkali solution and the sodium fluoride, the sodium carbonate may promote the formation of the water glass and serve as a sedimenting agent for sedimenting the cerium oxide particles. That is, the sodium carbonate promotes the formation of the water glass and contributes to better sedimentation of the cerium oxide particles, thereby enabling better layer separation between the cerium oxide particles and other kind of particle, for example, the water glass of the Na—F—Si—O structure. Accordingly, the cerium oxide particles may be separated more easily in the step (S140) of separating particles.

Also, the method for recycling a cerium oxide abrasive according to the present invention may further include a step (S150) of adjusting a pH of the slurry waste to a neutral level. That is, a pH of the cerium oxide abrasive slurry waste may be adjusted to a proper pH through cleaning with deionized water, and the recycled cerium oxide abrasive may be immediately used in a polishing process. Preferably, the step (S150) of adjusting a pH is performed after the step (S140) of separating particles, as shown in FIG. 3.

Hereinafter, the present invention is described in more detail through examples and comparative examples. That is, when a strong alkali solution and sodium fluoride are added and sodium carbonate is further added to recycle a cerium oxide abrasive used in a polishing process of a glass material according to the present invention through examples and comparative examples, the effect of separation of a cerium oxide particle is observed. However, the description proposed herein is just a preferable example for the purpose of illustrations only, not intended to limit the scope of the invention, so it should be understood that the examples are provided for a more definite explanation to an ordinary person skilled in the art.

Example 1

According to example 1 of the present invention, 6 g of NaOH, 1 g of NaF, and 80 g of a cerium oxide abrasive were put into 1000 cc of deionized water, followed by two-hour stirring. In this instance, the resulting solution was maintained at 90° C. After 5 minutes passed, a supernatant was removed, and sampling inspection was performed on a precipitate. The components of the precipitate were measured using an energy dispersive X-ray (EDX) analyzer, and the results are shown in Table 1.

Example 2

According to example 2 of the present invention, 6 g of NaOH, 1 g of NaF, 1.2 g of $Na_2CO_3$, and 80 g of a cerium oxide abrasive were put into 1000 cc of deionized water, followed by two-hour stirring. In this instance, the resulting solution was maintained at 90° C. After 5 minutes passed, a supernatant was removed, and sampling inspection was performed on a precipitate. The components of the precipitate were measured using an energy dispersive X-ray (EDX) analyzer, and the results are shown in Table 1.

Comparative Example

For comparison with the above examples, 80 g of a cerium oxide abrasive was put into 1000 cc of deionized water, followed by two-hour stirring. In this instance, the resulting solution was maintained at 90° C. After 5 minutes passed, a supernatant was removed, and sampling inspection was performed on a precipitate. The components of the precipitate were measured using an energy dispersive X-ray (EDX) analyzer, and the results are shown in Table 1.

TABLE 1

| Ion | Comparative example [wt %] | Example 1 [wt %] | Example 2 [wt %] |
|---|---|---|---|
| Ce | 49.1 | 54.6 | 55.6 |
| La | 22.0 | 24.2 | 25.7 |
| F/Pr/Nd | 13.6 | 14.9 | 15.4 |
| Others(Si, Al, C, . . . ) | 15.3 | 6.3 | 3.3 |

Referring to Table 1, a ratio of Ce ions in the precipitate of the comparative example is 49.1 wt %, while a ratio of Ce ions in the example 1 is 54.6 wt % and a ratio of Ce ions in the example 2 is 55.6 wt %. That is, it is found that a ratio of Ce ions in the precipitate is significantly increased in the examples 1 and 2 than in the comparative example. With regard to a ratio of other ions such as Si, Al, and C ions, the comparative example shows 15.3 wt %, the example 1 shows 6.3 wt %, and the example 2 shows 3.3 wt %. When compared with the comparative example, the examples 1 and 2 have a remarkable reduction in a ratio of other ions. Also, with regard to a ratio of La ions, the comparative example shows 22.0 wt %, the example 1 shows 24.2 wt %, and the example 2 shows 25.7 wt %. When compared with the comparative example, the examples 1 and 2 have an increase in a ratio of La ions. Also, with regard to a ratio of F, Pr, and Nd ions, the comparative example shows 13.6 wt %, the example 1 shows 14.9 wt %, and the example 2 shows 15.4 wt %. When compared with the comparative example, the examples 1 and 2 have an increase in a ratio of F, Pr, and Nd ions. The test results say that when a solid alkali solution and sodium fluoride are used to recycle a cerium oxide abrasive as shown in example 1, the separation efficiency of the cerium oxide abrasive components from the other components is considerably improved. Also, it is found that the use of sodium carbonate together with a solid alkali solution and sodium fluoride may promote the formation of a water glass and contribute to better sedimentation of cerium oxide particles, thereby separating the cerium oxide particles more easily.

Many modifications and other embodiments of the invention will come to mind to one skilled in the art to which this invention pertains having the benefit of the teachings presented in the foregoing description. Therefore, it should be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A method for recycling a cerium oxide abrasive used in polishing of a glass material, the method comprising:
    adding an alkali solution to a slurry waste of the cerium oxide abrasive to form structures, wherein each structure has alkali, silicon and oxygen atoms;
    adding sodium fluoride to the slurry waste to which the alkali solution is added, to form particles, wherein each particle has alkali, fluorine, silicon, and oxygen atoms; and
    separating a cerium oxide particle included in the slurry waste from the particles having alkali, fluorine, silicon, and oxygen atoms, formed in the sodium fluoride adding step.

2. The method for recycling a cerium oxide abrasive according to claim 1,
    wherein the alkali solution is at least one selected from the group consisting of an NaOH solution and a KOH solution.

3. The method for recycling a cerium oxide abrasive according to claim 1, further comprising:
    after the adding of the sodium fluoride,
    adding sodium carbonate to the slurry waste.

4. The method for recycling a cerium oxide abrasive according to claim 1,
    wherein the separating of the cerium oxide particle is performed using at least one selected from the group consisting of sedimentation, centrifugal separation, specific gravity separation, floatation, and filtration.

5. The method for recycling a cerium oxide abrasive according to claim 1, further comprising:
    after the adding of the sodium fluoride,
    adjusting a pH of the slurry waste to a neutral level.

* * * * *